US008789308B2

(12) United States Patent
Hughes

(10) Patent No.: US 8,789,308 B2
(45) Date of Patent: Jul. 29, 2014

(54) FISHING LURE

(75) Inventor: Timothy Richard Hughes, Reeds Spring, MO (US)

(73) Assignee: Bass Pro Intellectual Property, L.L.C., Springfield, MO (US)

(*) Notice: Subject to any disclaimer, the term of this patent is extended or adjusted under 35 U.S.C. 154(b) by 311 days.

(21) Appl. No.: 12/249,555

(22) Filed: Oct. 10, 2008

(65) Prior Publication Data
US 2009/0307959 A1 Dec. 17, 2009
US 2010/0287812 A2 Nov. 18, 2010

Related U.S. Application Data

(60) Provisional application No. 61/073,237, filed on Jun. 17, 2008.

(51) Int. Cl.
A01K 85/18 (2006.01)
A01K 85/16 (2006.01)
A01K 85/00 (2006.01)

(52) U.S. Cl.
USPC .......... 43/42.15; 43/42.24; 43/42.32

(58) Field of Classification Search
USPC ........... 43/42.15, 42.24, 42.26, 42.39, 42.32, 43/42.53
See application file for complete search history.

(56) References Cited

U.S. PATENT DOCUMENTS

| 586,620 | A | * | 7/1897 | Osborn | 43/42.24 |
|---|---|---|---|---|---|
| 588,729 | A | * | 8/1897 | Harris | 43/42.39 |
| 857,593 | A | * | 6/1907 | Brown | 43/42.15 |
| 865,683 | A | * | 9/1907 | Credlebaugh | 43/42.26 |
| 963,202 | A | * | 7/1910 | Bohannon | 43/42.28 |
| 1,109,439 | A | * | 9/1914 | Maus | 43/42.15 |
| 1,230,968 | A | * | 6/1917 | Wilber et al. | 43/42.26 |
| 1,390,601 | A | * | 9/1921 | Caldwell | 43/42.26 |
| 1,402,798 | A | * | 1/1922 | Ryan | 43/42.15 |
| 1,459,042 | A | * | 6/1923 | Wrege | 43/42.28 |
| 1,477,756 | A | * | 12/1923 | Heddon et al. | 43/42.15 |
| 1,523,895 | A | * | 1/1925 | Pott | 43/42.25 |
| 1,540,586 | A | * | 6/1925 | Adam | 43/42.26 |
| 1,553,933 | A | * | 9/1925 | Dills | 43/42.28 |
| 1,557,644 | A | * | 10/1925 | Andersen | 43/42.15 |

(Continued)

FOREIGN PATENT DOCUMENTS

CA 2 256 832 A1 6/2000
CN 1868271 11/2006

(Continued)

OTHER PUBLICATIONS

First Office Action as issued for Chinese Patent Application No. 200910163908.3, dated Apr. 25, 2011.

(Continued)

Primary Examiner — Darren W Ark
(74) Attorney, Agent, or Firm — Pillsbury Winthrop Shaw Pittman LLP

(57) ABSTRACT

A lipless fishing lure includes an inner, flexible fabric core, and a plurality of substantially rigid structural members. The plurality of substantially rigid structural members are adhered to the fabric core on opposite sides of the core. The rigid structural members are generally evenly spaced from one another in the longitudinal direction. The rigid structural members and the fabric core generally define the shape of a fish. The rigid structural members include a fish head. The fish head includes a front end with a relatively blunt transverse cross-sectional configuration.

13 Claims, 11 Drawing Sheets

(56) References Cited

U.S. PATENT DOCUMENTS

| | | | | |
|---|---|---|---|---|
| 1,568,325 | A * | 1/1926 | Dewey | 43/42.28 |
| 1,607,107 | A * | 11/1926 | Weller | 43/42.15 |
| 1,611,635 | A * | 12/1926 | Dills | 43/42.26 |
| 1,672,498 | A * | 6/1928 | Otto | 43/42.26 |
| 1,828,574 | A * | 10/1931 | Neukam | 43/42.15 |
| 1,833,522 | A * | 11/1931 | Goble | 43/42.15 |
| 1,994,692 | A * | 3/1935 | Davenport | 43/42.28 |
| 2,039,039 | A * | 4/1936 | Steen | 43/42.28 |
| 2,134,401 | A * | 10/1938 | Harvey | 43/42.28 |
| 2,189,487 | A * | 2/1940 | Davenport | 43/42.28 |
| 2,224,389 | A * | 12/1940 | Haselwood | 43/42.28 |
| 2,317,781 | A * | 4/1943 | Lehto | 43/42.26 |
| 2,473,142 | A * | 6/1949 | Gilmore | 43/42.26 |
| 2,515,591 | A * | 7/1950 | Clink | 43/42.26 |
| 2,571,980 | A * | 10/1951 | Weigandt | 43/42.26 |
| 2,583,942 | A * | 1/1952 | Harvey | 43/42.26 |
| 2,612,717 | A * | 10/1952 | Kuehnel | 43/42.15 |
| 2,619,762 | A * | 12/1952 | Summitt, Sr. | 43/42.26 |
| 2,623,318 | A * | 12/1952 | Weigandt | 43/42.09 |
| 2,643,418 | A * | 6/1953 | Auldridge | 43/42.53 |
| 2,661,564 | A * | 12/1953 | Weigandt | 43/42.26 |
| 2,722,766 | A * | 11/1955 | Accetta | 43/42.24 |
| 2,865,130 | A * | 12/1958 | Accetta | 43/42.15 |
| 2,971,285 | A * | 2/1961 | Murawski | 43/42.15 |
| 3,068,604 | A * | 12/1962 | Nyberg | 43/42.24 |
| 3,122,853 | A * | 3/1964 | Koonz et al. | 43/42.24 |
| 3,191,336 | A * | 6/1965 | Cordell, Jr | 43/42.24 |
| 3,205,609 | A * | 9/1965 | Knapton | 43/42.26 |
| 3,218,750 | A * | 11/1965 | Lewin | 43/42.28 |
| 3,359,674 | A * | 12/1967 | Strumor | 43/42.28 |
| 3,382,600 | A * | 5/1968 | Walters | 43/42.28 |
| 3,445,953 | A * | 5/1969 | Dailey | 43/42.26 |
| 3,461,598 | A * | 8/1969 | Brewster | 43/42.26 |
| 3,490,165 | A * | 1/1970 | Thomassin | 43/42.24 |
| 3,537,207 | A * | 11/1970 | McClellan et al. | 43/42.15 |
| 3,621,600 | A * | 11/1971 | Dworski | 43/42.39 |
| 3,654,724 | A * | 4/1972 | Charron | 43/42.28 |
| 3,683,543 | A * | 8/1972 | Santosuosso | 43/42.39 |
| 3,685,192 | A * | 8/1972 | Stibbard | 43/42.24 |
| 3,685,197 | A * | 8/1972 | McClellan | 43/42.24 |
| 3,735,518 | A * | 5/1973 | Kleine et al. | 43/42.15 |
| 3,755,952 | A * | 9/1973 | Oliphant | 43/42.26 |
| 3,861,073 | A * | 1/1975 | Thomassin | 43/42.24 |
| 3,899,847 | A * | 8/1975 | Dworski | 43/42.15 |
| 3,942,280 | A * | 3/1976 | Ryder et al. | 43/42.15 |
| 3,967,406 | A * | 7/1976 | Anderson | 43/42.24 |
| 3,979,853 | A * | 9/1976 | Storm et al. | 43/42.39 |
| 4,044,492 | A * | 8/1977 | Ingram | 43/42.28 |
| 4,094,087 | A * | 6/1978 | Carpenter | 43/42.24 |
| 4,149,334 | A * | 4/1979 | Rogers | 43/42.53 |
| 4,214,396 | A * | 7/1980 | Firmin | 43/42.24 |
| 4,437,257 | A * | 3/1984 | Kluge | 43/42.53 |
| 4,450,645 | A * | 5/1984 | Ancona | 43/42.26 |
| 4,654,995 | A * | 4/1987 | Rapelje | 43/42.15 |
| 4,831,764 | A * | 5/1989 | Jecevicus | 43/42.26 |
| 4,831,765 | A * | 5/1989 | Bradshaw | 43/42.32 |
| 4,858,368 | A * | 8/1989 | Tolner et al. | 43/42.36 |
| 4,893,430 | A * | 1/1990 | Barfield | 43/42.24 |
| 5,063,704 | A * | 11/1991 | Phillips | 43/42.25 |
| 5,182,875 | A * | 2/1993 | Righetti | 43/42.24 |
| 5,406,738 | A * | 4/1995 | Holleman, Sr. | 43/42.15 |
| 5,412,899 | A * | 5/1995 | Reboul | 43/42.13 |
| 5,494,432 | A * | 2/1996 | Coggins et al. | 43/42.24 |
| 5,522,170 | A * | 6/1996 | Cole | 43/42.15 |
| 5,678,350 | A * | 10/1997 | Moore | 43/42.15 |
| D398,698 | S * | 9/1998 | Tirone, Jr. | D22/126 |
| 5,946,848 | A * | 9/1999 | Ysteboe et al. | 43/42.15 |
| 6,164,006 | A * | 12/2000 | Peterson | 43/42.24 |
| 6,182,391 | B1* | 2/2001 | Hubbard | 43/42.32 |
| 6,385,896 | B1* | 5/2002 | Thomassin | 43/42.03 |
| 6,393,758 | B1* | 5/2002 | Sparkman | 43/42.53 |
| 6,460,286 | B1* | 10/2002 | Wilson | 43/42.15 |
| 6,560,914 | B2* | 5/2003 | Kruger | 43/42.15 |
| 6,647,660 | B1* | 11/2003 | Kruger | 43/42.53 |
| 6,662,487 | B2* | 12/2003 | Perrone, Jr. | 43/42.24 |
| 6,910,295 | B2* | 6/2005 | Nakahashi | 43/42.15 |
| 6,912,808 | B1* | 7/2005 | Mak | 43/42.15 |
| 6,918,204 | B1* | 7/2005 | Trantham | 43/42.13 |
| 7,104,004 | B1* | 9/2006 | Renosky | 43/42.24 |
| 7,356,963 | B2* | 4/2008 | Scott | 43/42.15 |
| 7,716,868 | B2* | 5/2010 | Emmott | 43/42.06 |
| 7,788,842 | B2* | 9/2010 | Tsai | 43/42.15 |
| 8,181,382 | B2* | 5/2012 | Pack | 43/42.15 |
| 2002/0189150 | A1* | 12/2002 | Thorne | 43/42.15 |
| 2006/0059767 | A1* | 3/2006 | Tsai | 43/42.15 |
| 2006/0236588 | A1* | 10/2006 | Rapelje | 43/42.24 |
| 2006/0260176 | A1* | 11/2006 | Yeung | 43/42.15 |
| 2007/0062097 | A1* | 3/2007 | Tsai | 43/42.15 |
| 2007/0137094 | A1* | 6/2007 | Patrick | 43/42.26 |
| 2007/0175083 | A1* | 8/2007 | Wilson et al. | 43/42.15 |
| 2007/0261289 | A1* | 11/2007 | Hobbins | 43/42.24 |
| 2008/0078114 | A1* | 4/2008 | Pack | 43/42.15 |
| 2010/0011651 | A1* | 1/2010 | Rapelje | 43/42.24 |
| 2010/0146837 | A1* | 6/2010 | Zernov | 43/42.15 |
| 2012/0102815 | A1* | 5/2012 | Hughes | 43/42.15 |

FOREIGN PATENT DOCUMENTS

| | | | | |
|---|---|---|---|---|
| CN | 1868271 | A | 11/2006 | |
| EP | 653156 | A1 * | 5/1995 | A01K 85/16 |
| EP | 1763996 | A1 * | 3/2007 | A01K 85/18 |
| FR | 2587648 | A1 * | 3/1987 | A01K 85/00 |
| FR | 2652991 | A1 * | 4/1991 | A01K 85/18 |
| FR | 2691043 | A1 * | 11/1993 | A01K 85/16 |
| FR | 2724091 | A1 * | 3/1996 | A01K 85/16 |
| FR | 2808654 | A1 * | 11/2001 | A01K 85/16 |
| FR | 2835149 | A3 * | 8/2003 | A01K 85/16 |
| GB | 2239151 | A * | 6/1991 | A01K 85/18 |
| JP | 10084817 | A * | 4/1998 | A01K 85/18 |
| JP | 2002204634 | A * | 7/2002 | A01K 85/00 |
| JP | 2002335815 | A * | 11/2002 | A01K 85/00 |
| JP | 2004089098 | A * | 3/2004 | A01K 85/00 |
| JP | 2004357646 | A * | 12/2004 | A01K 85/18 |
| JP | 2005065668 | A * | 3/2005 | A01K 85/16 |
| JP | 2005229824 | A * | 9/2005 | A01K 85/16 |
| JP | 2006223296 | A * | 8/2006 | A01K 85/16 |
| JP | 2007020446 | A * | 2/2007 | A01K 85/16 |
| JP | 2007053956 | A * | 3/2007 | A01K 85/18 |
| JP | 2007061070 | A * | 3/2007 | A01K 85/18 |
| JP | 2007117025 | A * | 5/2007 | A01K 85/16 |
| JP | 2008118947 | A * | 5/2008 | A01K 85/18 |
| WO | WO 9937144 | A1 * | 7/1999 | A01K 85/16 |

OTHER PUBLICATIONS

Canadian Office Action dated Aug. 3, 2012 for patent application No. 2,669,029.

Chinese Office Action dated Feb. 8, 2013 for Appl. No. 200910163908.3.

* cited by examiner

FISHING LURE

BACKGROUND OF THE INVENTION

This application relies on the benefit for priority from U.S. Provisional Application No. 61/073,237, filed on Jun. 17, 2008, which is incorporated herein by reference in its entirety.

FIELD OF THE INVENTION

The present invention relates to a fishing lure that resembles a fish.

Fishing lures are well known for use in catching fish. Fishing lures are attached to an end of a fishing line and designed to attract a fish to bite on a hook attached to the fishing lure. Fishing lures are designed to simulate or resemble a natural food source (e.g., a bait fish) for the fish both in appearance and in movement. The present invention provides improvements over the prior art fishing lures.

SUMMARY OF THE INVENTION

One aspect of the present invention is a lipless fishing lure. In one embodiment, the fishing lure may include an inner, flexible fabric core, and a plurality of substantially rigid structural members. The plurality of substantially rigid structural members are adhered to the fabric core on opposite sides of the core. The rigid structural members are generally evenly spaced from one another in the longitudinal direction. The rigid structural members and the fabric core generally define the shape of a fish. The rigid structural members include a fish head. The fish head includes a front end with a relatively blunt transverse cross-sectional configuration.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
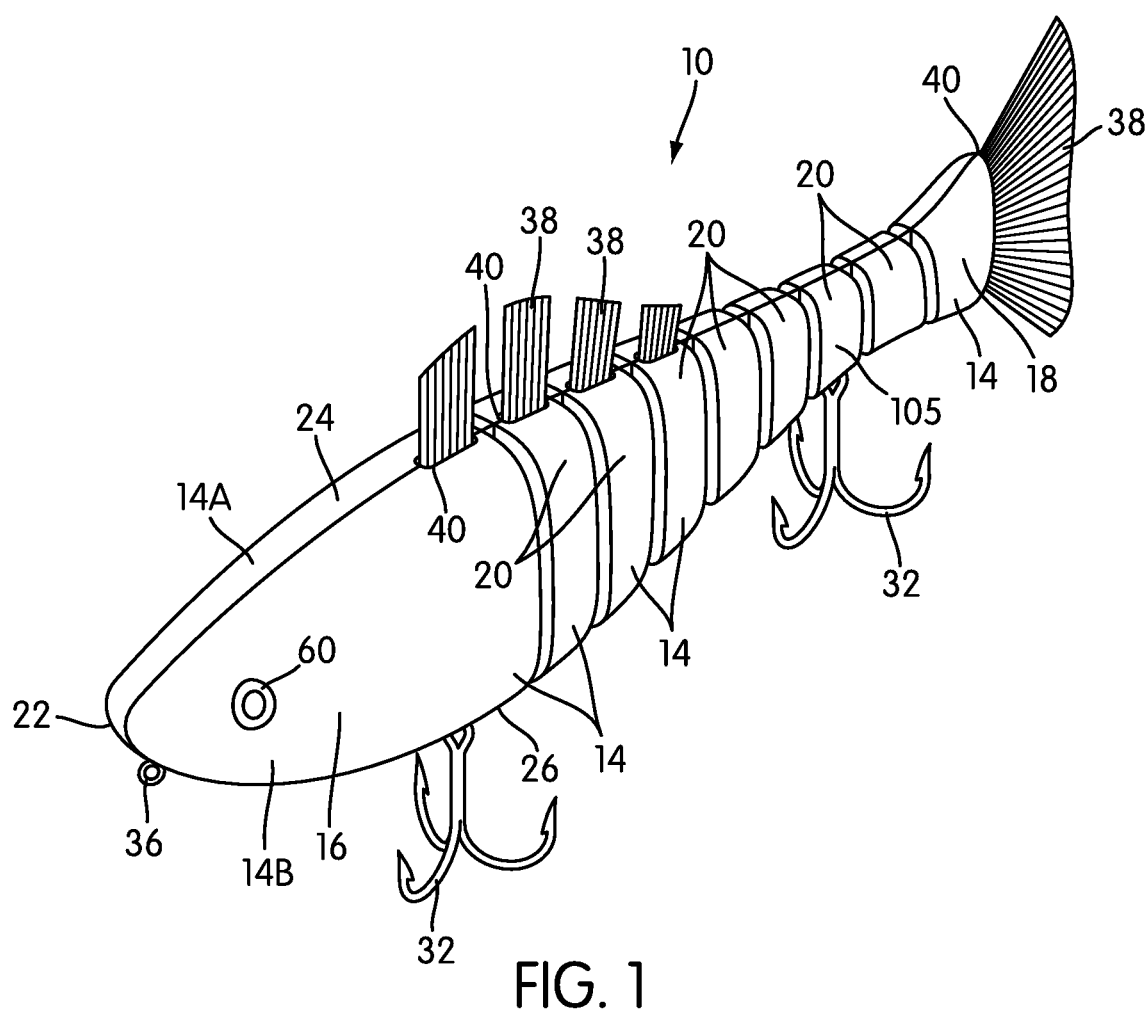
FIG. 1 is a perspective view of a lipless fishing lure in accordance with an embodiment of the present invention.
Figure 2:
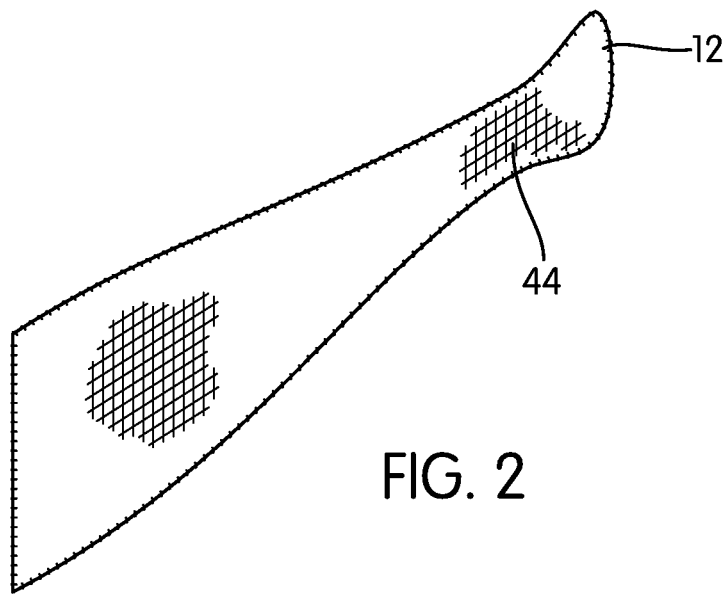
FIG. 2 is a perspective view of inner, flexible fabric core in accordance with an embodiment of the present invention.

FIG. 1 shows a fishing lure 10 in accordance with an embodiment of the invention. The fishing lure 10 may generally include an inner, flexible fabric core 12 (as best shown in FIG. 2), and a plurality of substantially rigid structural members 14. The plurality of substantially rigid structural members 14 are adhered to the fabric core 12 on opposite sides of the core 12 as will be explained in detail with respect to FIGS. 3 and 6. The rigid structural members 14 are generally evenly spaced from one another in the longitudinal direction as will be explained in detail with respect to FIGS. 6 and 7. The rigid structural members 14 and the fabric core 12 generally define the shape of a fish. The rigid structural members 14 include a fish head 16. The fish head 16 includes a front end 22 with a relatively blunt transverse cross-sectional configuration as will be explained with respect to FIG. 13.

In one embodiment, the rigid structural members 14 are made from wood. Alternatively, in another embodiment, the rigid structural members 14 are made from a plastic material. In one embodiment, the plastic material used to form the rigid structural members 14 may include a hard plastic material, such as ABS plastic.

Figure 12:
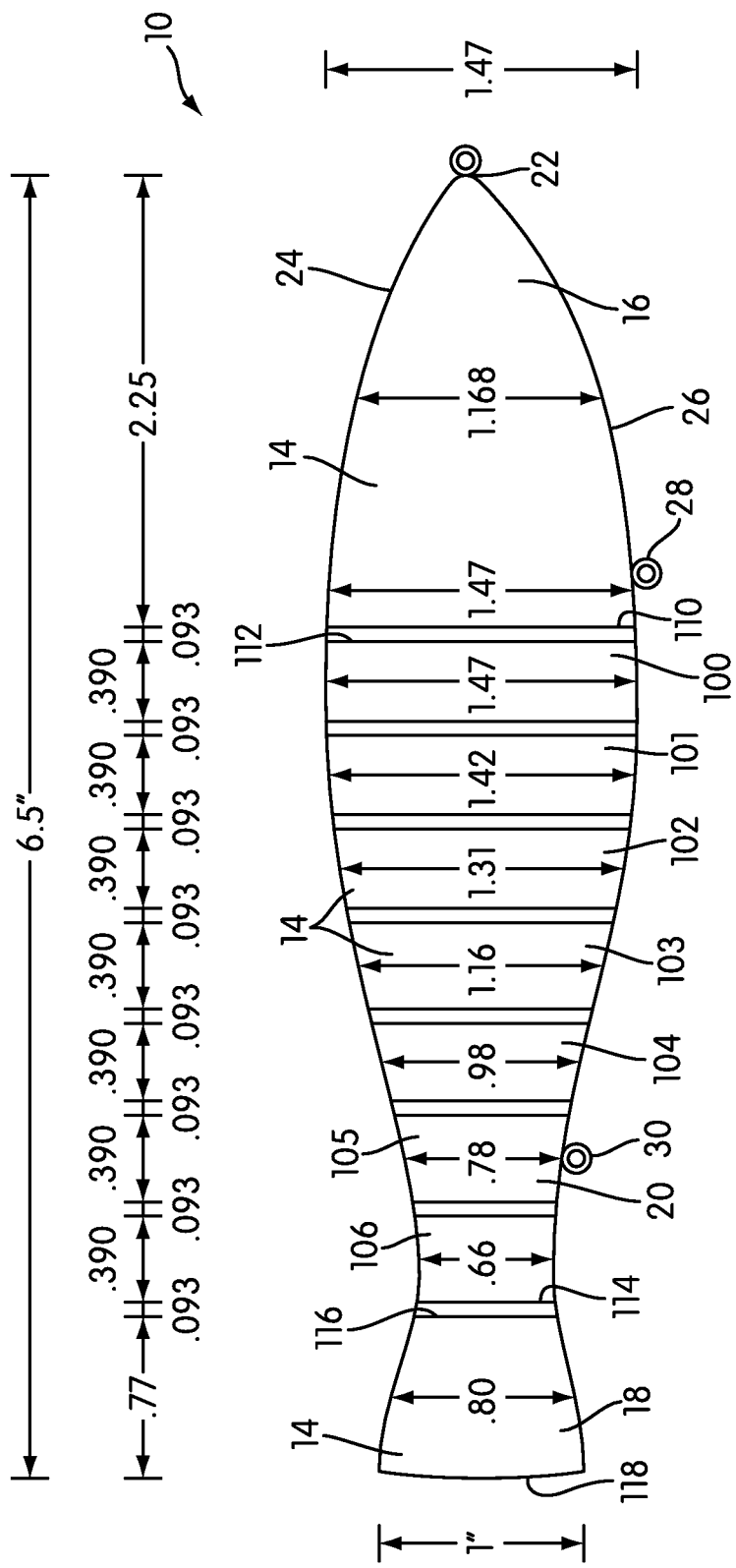
FIG. 12 is a side view of the lipless fishing lure in accordance with an embodiment of the present invention.

In one embodiment, the rigid structural members 14 may include the fish head 16, a fish tail 18, and a plurality of body members 20 that are located between the fish head 16 and the fish tail 18. In the illustrated embodiment, as just one example is shown in FIG. 12, the plurality of body members 20 of the fishing lure 10 may include seven body members 100-106 that are located between the fish head 16 and fish tail 18. However, the number of body members 20 that are located between the fish head 16 and fish tail 18 can vary significantly in number.

Figure 11:
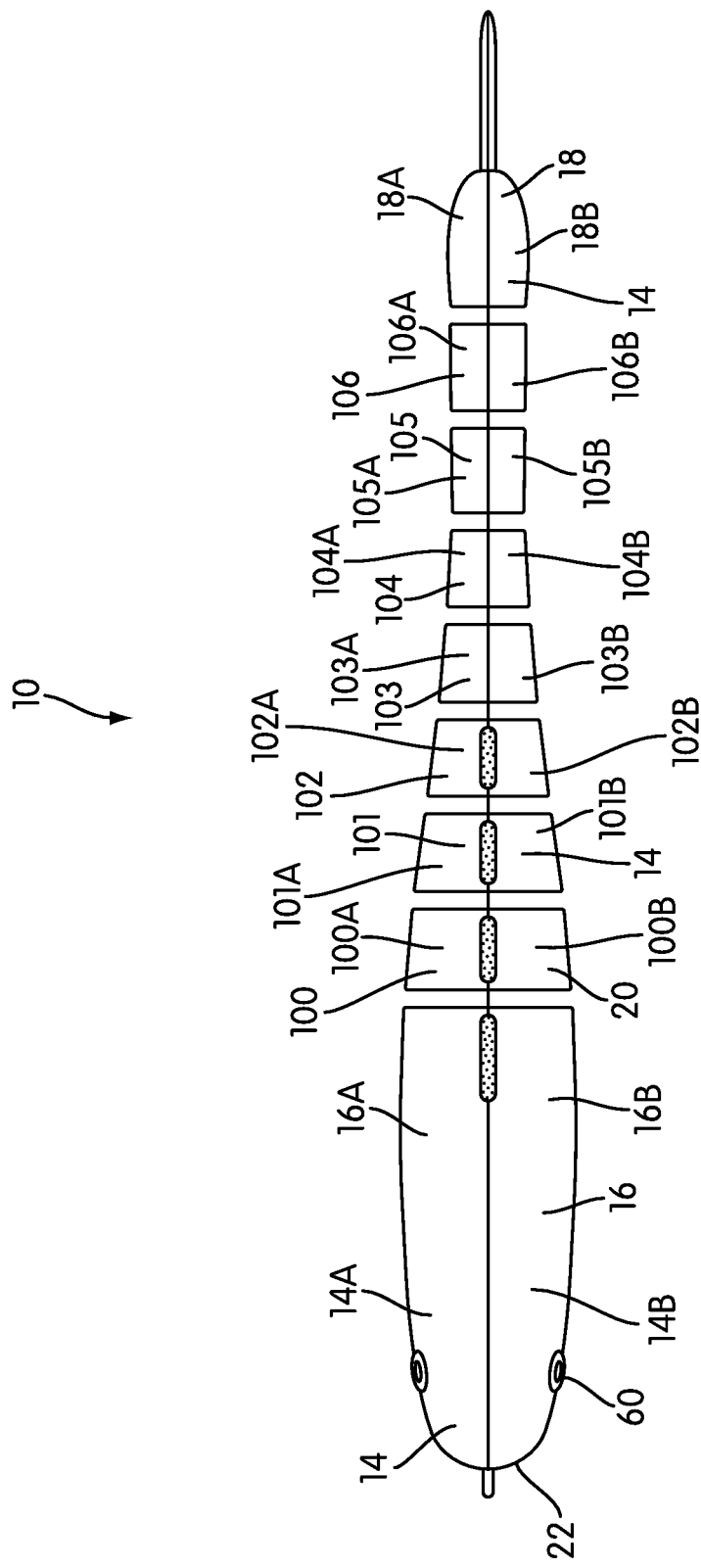
FIG. 11 is a top view of the lipless fishing lure in accordance with an embodiment of the present invention.
Figure 13:
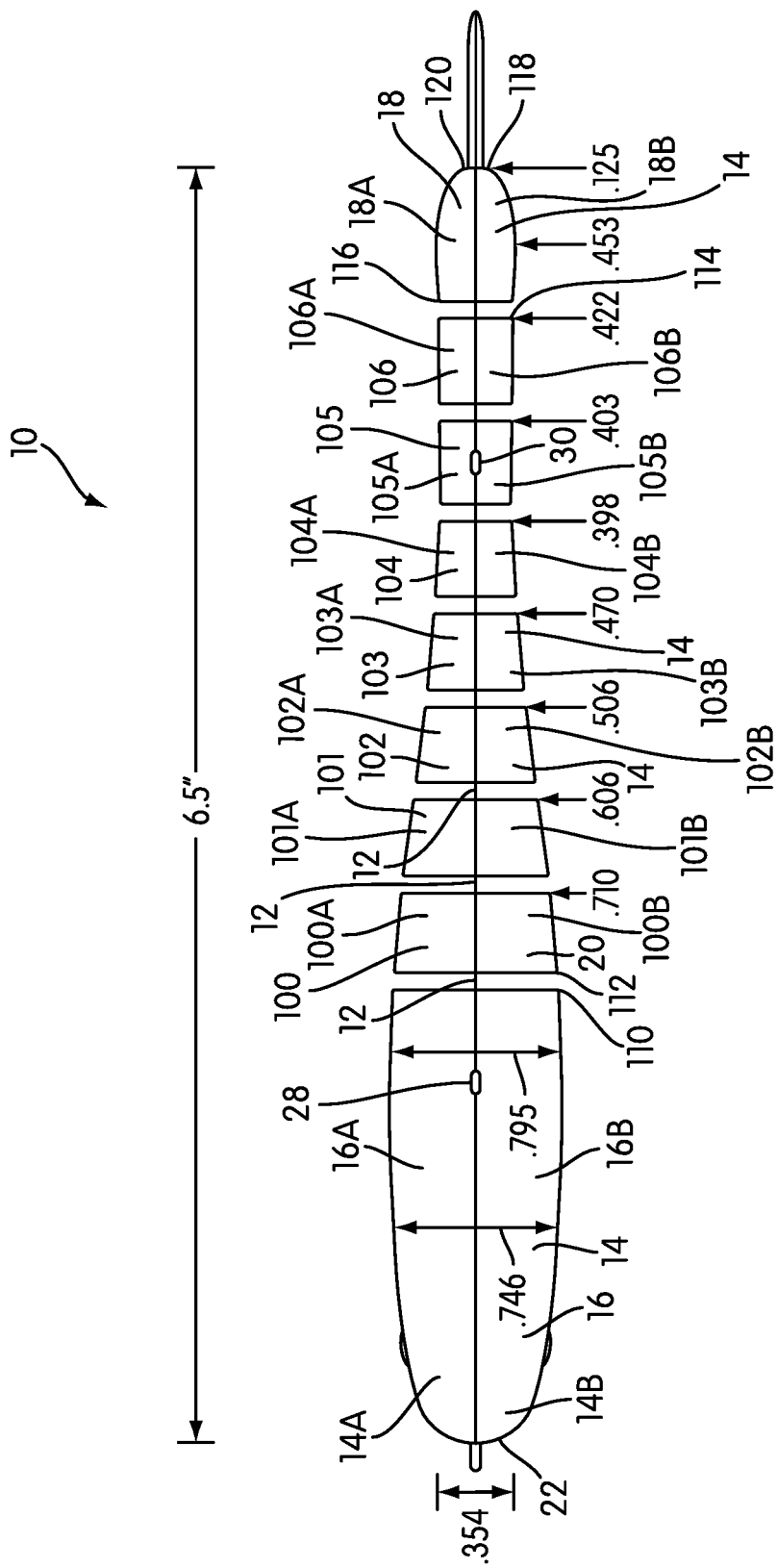
FIG. 13 is a bottom view of the lipless fishing lure in accordance with an embodiment of the present invention.

Each rigid structural member 14 includes opposing, rigid structural members 14A and 14B, where 14A represents the left structural member and 14B represents the right structural member. For example, as shown in FIGS. 11 and 13, the fish head 16 includes left fish head member 16A and right fish head member 16B, and the fish tail 18 includes left fish tail member 18A and right fish tail member 18B. Similarly, as shown in FIGS. 11 and 13, the body members 100-106 include left body members 100A, 101A, 102A, 103A, 104A,

105A, and 106A, and right body members 100B, 101B, 102B, 103B, 104B, 105B, and 106B respectively.

The fish head 16 may optionally include a weight (not shown) embedded inside the fish head 16. This weight can be used to distribute the weight of the fishing lure 10 as desired, and/or to provide balance to the fishing lure 10, when the fishing lure 10 is in drawn through water. The weight may also add relative stability to the head 16, which may flex and swivel less than the tail portion 18 of the lure 10 to simulate life-like motion of a fish. In one embodiment, the weight in the fish head 16 of the fishing lure 10 is made from a lead material. As noted above, the fish head 16 includes the front end 22 with a relatively blunt transverse cross-sectional configuration, as is shown and explained later with respect to FIG. 13.

Figure 3:
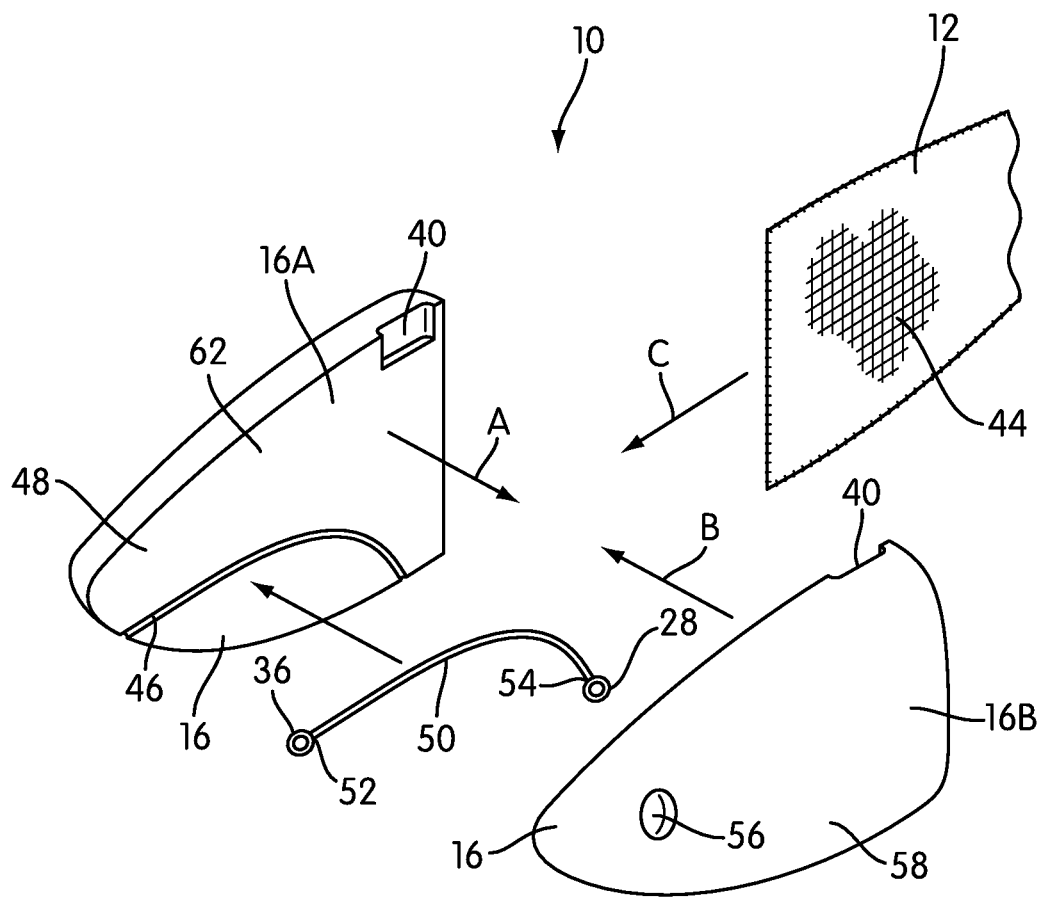
FIG. 3 is a perspective view of the flexible fabric core being attached to a rigid structural member, where the rigid structural member includes a channel to accommodate a wire therein in accordance with an embodiment of the present invention.

The head 16 generally includes a flat, top surface portion 24 and a flat, bottom surface portion 26 as such surface portions extend from side to side, left to right or right to left. Another words, a line taken across the top surface portion 24 or bottom surface portion 26 is substantially linear or only slightly curved. The top surface portion 24 and bottom surface portion 26 meet at the front end portion 22, which is also substantially linear or slightly curved as it extends from side to side. Specifically, the top surface portion 24, as it approaches the front end portion 22 curves downwards, while the bottom surface portion 26 curves upwards as it approaches the front end portion 22. The generally linear on slightly curved side-to-side surface configuration of the front end portion 22 contributes to the life-like movement of the lure 10 as it is pulled through water. The fish head 16 includes a loop 28, as shown in FIGS. 3 and 12, attached to the bottom surface 26 of the fish head 16. Another loop 30, as shown in FIG. 12, is attached to the bottom surface 26 of the body member 105. However, the number and location of loops 28 and 30 (e.g., on the bottom surface 26 of the body member 105) can vary. The loops 28 and 30, as shown in FIG. 12, are constructed and arranged to receive hooks 32.

Figure 10:
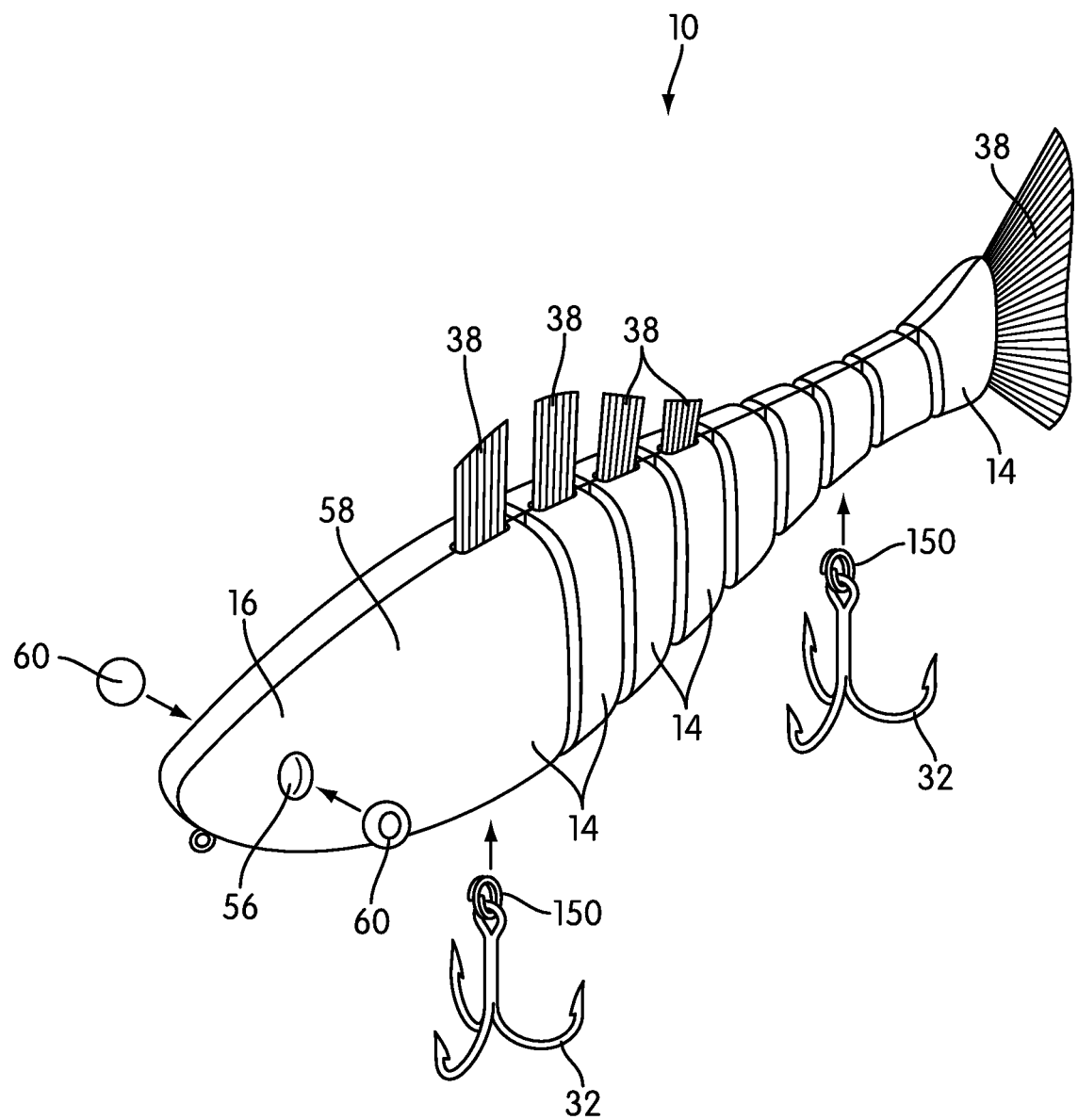
FIG. 10 is a perspective view of the lipless fishing lure, where eyes and hooks are attached to the rigid structural members in accordance with an embodiment of the present invention.

In the illustrated embodiment, the hook 32 is a three pronged hook or a treble hook. In another embodiment, the hook 32 may include a single hook or a double hook. In one embodiment, the loops 28 and 30, as shown in FIG. 12, may be connected to the hooks 32 using rings 150 (as shown in FIG. 10).

The fishing lure 10 may include a fishing line loop 36 attached to the front end 22 of the fish head 16. The fishing line loop 36 is constructed and arranged to facilitate attachment of the fishing lure 10 to a fishing line (not shown). The fishing lure 10 may be connected to a fishing line at loop 36 by any attachment mechanism, such as tying the line to the loop 36. In one embodiment, the fishing line is secured directly to the fishing line loop 36. In another embodiment, the fishing line is connected to the fishing line loop. 36 by using a connector.

The fishing lure 10 may include a plurality of bristle fins 38. The bristle fins 38 can be attached to the lure by being slid into grooves 40 formed in the rigid structural members 14 and adhering them in place (e.g., via an adhesive). In one embodiment, the bristle fins 38 are made of a nylon material.

FIGS. 2-10 show the method of manufacturing the fishing lure 10. The method of manufacture begins by taking the flexible, fabric core 12 of a desired length and width as shown in FIG. 2. In one embodiment, the flexible, fabric core 12 is cut to a desired shape, for example, a fish. In such embodiment, the binding is provided along the edges (e.g., cut edges) of the fabric core 12 to prevent tearing and fraying of the fabric core 12.

FIG. 2 shows the inner, flexible fabric core 12. In one embodiment, the fabric core 12 is formed from a polyester material. In one embodiment, the thickness of the polyester material is less than 6/1000$^{th}$ of an inch. In another embodiment, the fabric core 12 is made from a nylon material. In one embodiment, the fabric core is in the form of a nylon ribbon. In the illustrated embodiment, the fabric core 12 may include fabric strands 44, for example, polyester or nylon strands.

FIG. 3 shows the next procedure in the method of manufacture of the fishing lure 10, where the fish head 16 of the fishing lure 10 is attached to the fabric core 12. As noted above, the fish head 16 of the fishing lure 10 includes a pair of opposing rigid structural members, the left fish head member 16A and the right fish head member 16B that are constructed and arranged to attach on opposite sides of the fabric core 12. The left fish head member 16A and the right fish head member 16B each include a channel 46 formed on an inner surface 48 thereof. The channels 46 are constructed and arranged to accommodate a wire 50 therein. The fishing line loop 36 and the loop 28 are attached to ends 52 and 54 of the wire 50 respectively.

As shown in FIG. 3, the wire 50 with loops 36 and 28 attached to the ends 52 and 54 thereof is received in the channel 46 formed in the inner surface 48 of the left fish head member 16A. Once the wire 50 is accommodated in the channel 46, the left fish head member 16A and the right fish head member 16B are moved towards each other in the direction of arrows A and B respectively. As the left fish head member 16A and the right fish head member 16B move towards each other, the left fish head member 16A and the right fish head member 16B sandwich a portion of the fabric core 12 therebetween such that the left fish head member 16A and the right fish head member 16B are adhered on opposite sides of the portion of the fabric core 12. In one embodiment, the portion of the fabric core 12 is moved in the direction of an arrow C as the fabric core 12 is sandwiched between the left fish head member 16A and the right fish head member 16B of the fish head 16. The left fish head member 16A and the right fish head member 16B of the fish head 16 are adhered to each other and to the portion of the flexible core 12 using an adhesive.

Figure 4:
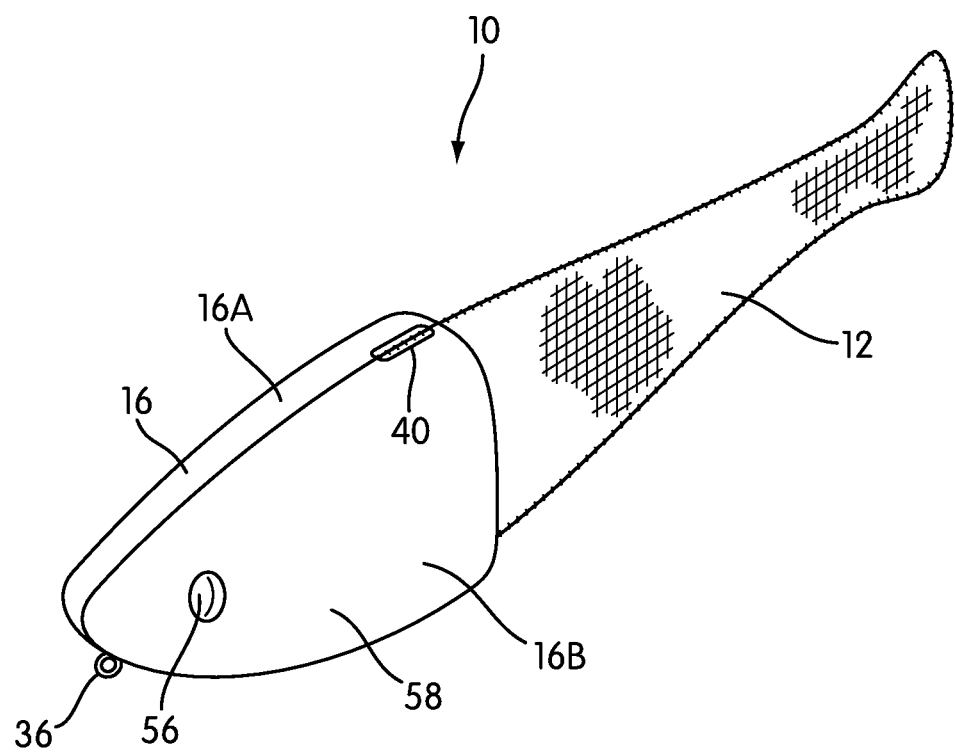
FIG. 4 is a perspective view of the rigid structural member after being attached to the flexible fabric core in accordance with an embodiment of the present invention.

The left fish head member 16A and the right fish head member 16B of the fish head 16 includes grooves 56 formed on outer surfaces 58 thereof. Each groove 56 is constructed and arranged to receive an eye 60 (as shown in FIGS. 1, 10 and 11) of the fish, as will be discussed in detail with respect to FIG. 10. In the illustrated embodiment, as shown in FIGS. 3 and 4, the grooves 56 are generally circular in shape.

As noted earlier, the left fish head member 16A and the right fish head member 16B of the fish head 16 includes the grooves 40 formed on inner surfaces 62 thereof. The grooves 40 are constructed and arranged to receive the bristle fins 38, as shown in FIG. 1. FIG. 4 shows the fishing lure 10 with the fish head 16 attached to the fabric core 12. The left fish head member 16A and the right fish head member 16B of the fish head 16 sandwiches the portion of the fabric core 12 and encloses the wire 50 (as shown in FIG. 3) therebetween as the left fish head member 16A and the right fish head member 16B are adhered to one another.

Figure 5:
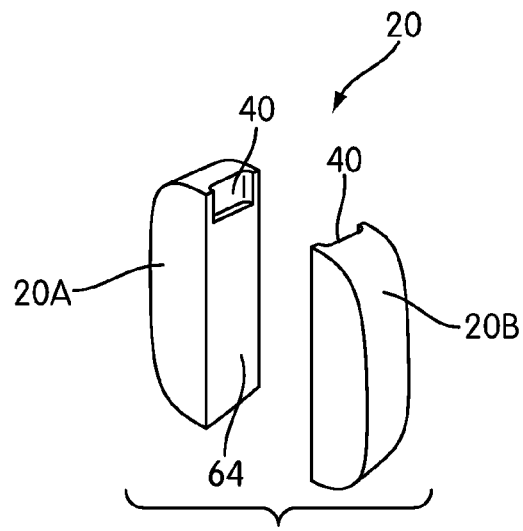
FIG. 5 is a perspective view of the two identical, opposing rigid structural members with grooves formed therein in accordance with an embodiment of the present invention.

FIG. 5 shows a pair of opposing rigid structural members, the left body member 20A and the right body member 20B of body member 20. The grooves 40 are formed on the inner surfaces 64 of the left body member 20A and the right body member 20B such that when the opposing rigid structural members 20A and 20B are adhered to each other the grooves 40 are constructed and arranged to receive the bristle fins 38 (as shown in FIG. 1).

Figure 6:
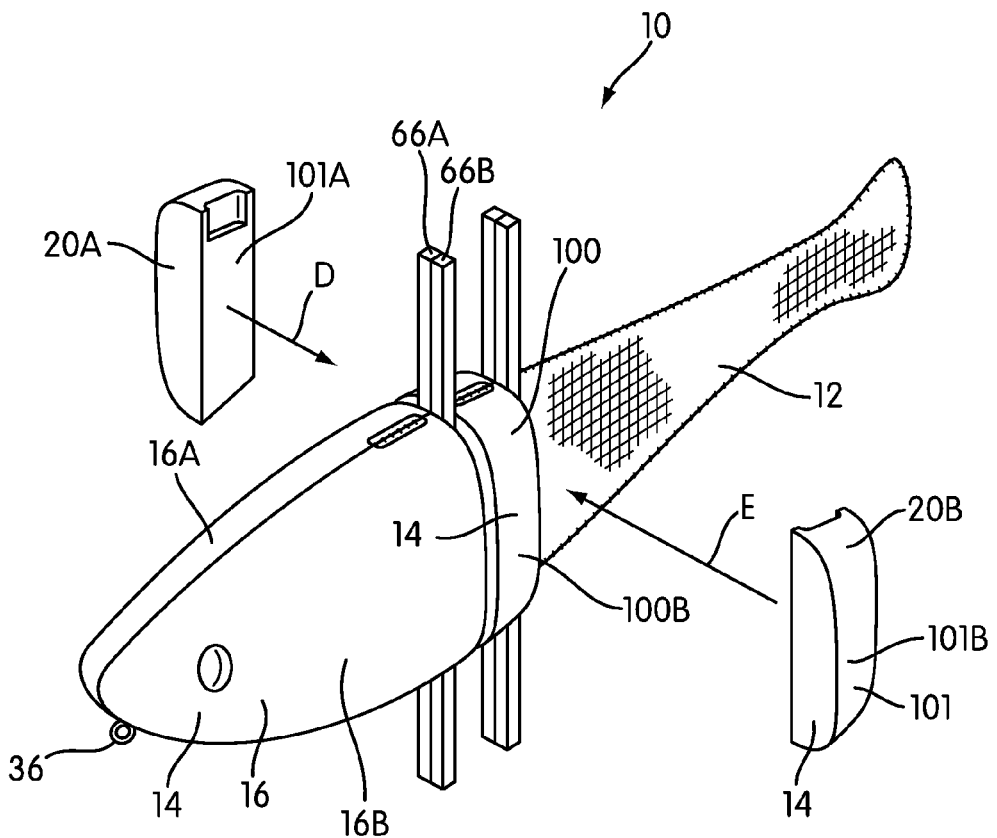
FIG. 6 is a perspective view of the lipless fishing lure, where the rigid structural members are being adhered to the fabric core on opposite sides of the flexible, fabric core in accordance with an embodiment of the present invention.
Figure 7:
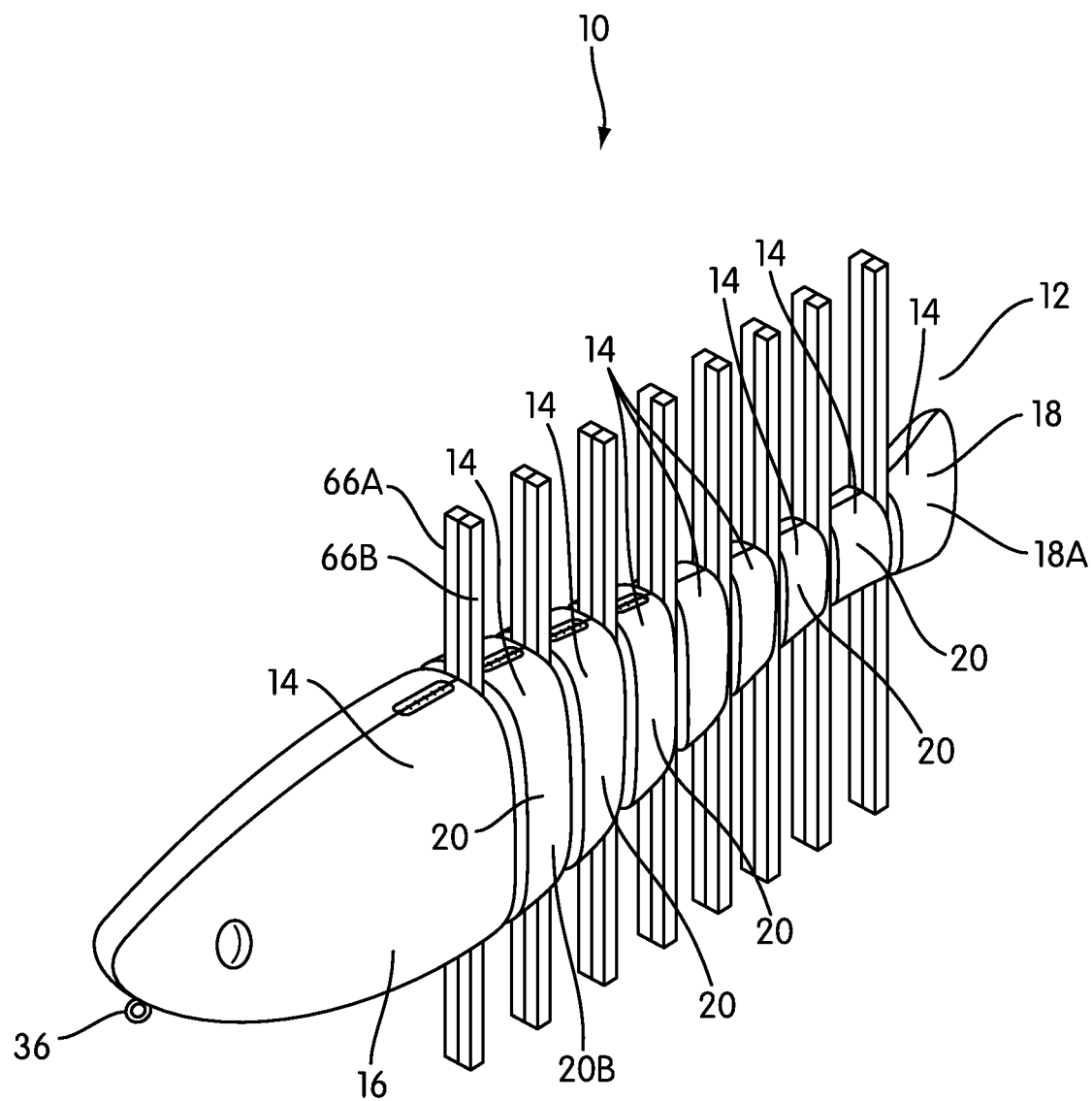
FIG. 7 is a perspective view of the lipless fishing lure after the rigid structural members are attached to the flexible fabric core in accordance with an embodiment of the present invention.

FIG. 6 shows next procedure in the method of manufacture of the fishing lure 10, where the left body member 20A and the right body member 20B of the body member 20 are attached on opposite sides of the fabric core 12. The body members 20 are generally evenly spaced from one another in the longitudinal direction. The body members 20 are generally evenly spaced from the fish head 16 and the fish tail 18 (as shown in FIG. 7). In the illustrated embodiment, the spacing between the rigid structural members 14 is achieved using spacers 66A and 66B.

As shown in FIG. 6, after the left fish head member 16A and the right fish head member 16B are adhered to one another and to the fabric core 12, the spacers 66A and 66B are then placed on opposite sides of the fabric core 12 to maintain the spacing between the fish head 16 and the adjacent body member 100. The left body member 100A (as shown in FIGS. 11 and 12) and the right body member 100B of the body member 100 are attached on opposite sides of the fabric core 12, the spacers 66A and 66B are then placed on opposite sides of the fabric core 12 to maintain the spacing between the body member 100 and the adjacent body member 101. A pair of opposing rigid structural members, the left body member 101A and the right body member 101B of the body member 101 are moved towards each other in the direction of arrows D and E respectively, and are placed adjacent to the spacers 66A and 66B such that the left body member 101A and the right body member 101B of the body member 101 adhere to the fabric core 12 from the opposite sides.

Similarly, as shown in FIG. 7, the rest of the opposing body members 20A (as shown in FIGS. 11 and 13) and 20B of the body members 20 and the opposing fish tail members 18A (as shown in FIGS. 11 and 13) and 18B of the fish tail 18 are adhered to the fabric core 12 from opposite sides. The spacing between the rigid structural members 14 is maintained by using the spacers 66A and 66B. As noted above, the opposing rigid structural members 14 are adhered to the flexible core 12 from the opposite sides using an adhesive.

Figure 8:
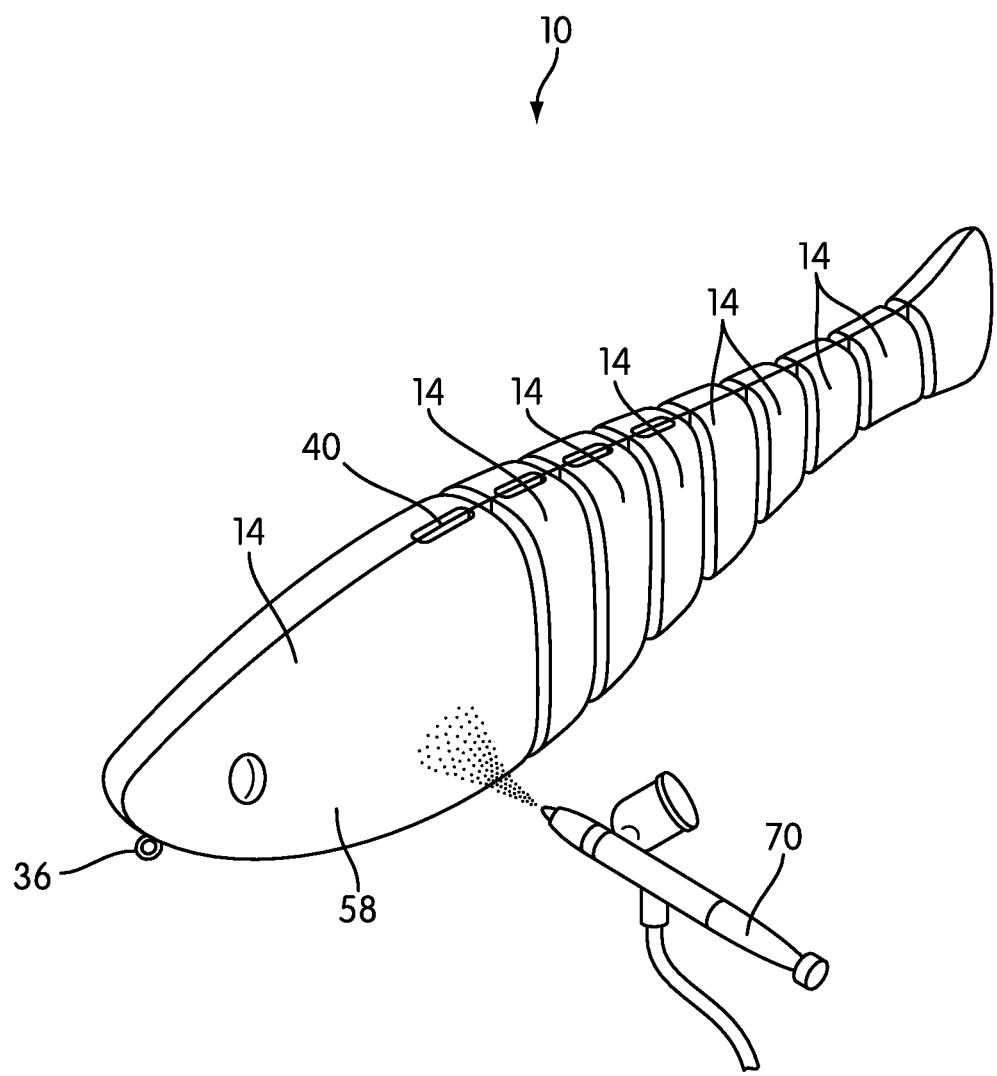
FIG. 8 is a perspective view of the lipless fishing lure, where the fishing lure is color coated using an air brush technique in accordance with an embodiment of the present invention.

After all the opposing rigid structural members 14 are adhered to the flexible core 12 using an adhesive, the spacers 66A and 66B are removed. FIG. 8 shows the next procedure in the method of manufacture of the fishing lure 10, where the color coating is applied to the fishing lure 10. In one embodiment, the color coating is applied to the fishing lure 10 using air brushing technique. In the illustrated embodiment, an air brush 70 is used to apply color coating to the fishing lure 10. In one embodiment, a holographic pattern of the fish is transferred to and adhered to surface of the rigid structural members 14 using hot stamping technique. In one embodiment, the hot stamping technique is performed prior to applying the color coating to the rigid structural members 14. The colors or color combinations used during the color coating process allow the fishing lure 10 to resemble a fish and to help attract target species of fish. In one embodiment, the colors and color combinations are used to provide a plurality of patterns on the outer surface 58 of the rigid structural members 14 so that the plurality of patterns formed on the outer surface 58 resemble scales, fins and gill cover of a fish. In another embodiment, gill cover (not shown) and scales (not shown) may be formed on the outer surface 58 of the rigid structural members 14, prior to applying the color coating to the rigid structural members 14.

Figure 9:
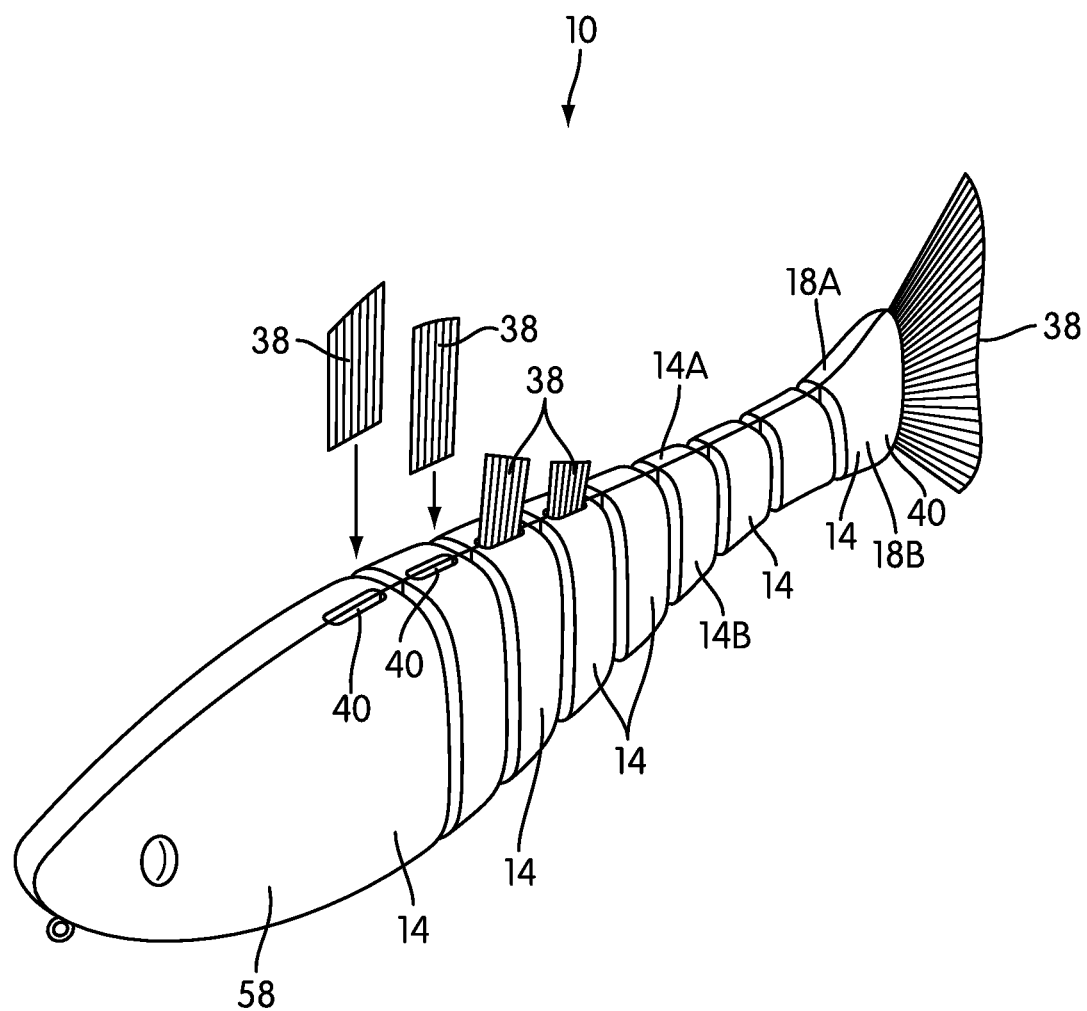
FIG. 9 is a perspective view of the lipless fishing lure, wherein bristle fins are attached into the grooves formed in the rigid structural members in accordance with an embodiment of the present invention.

FIG. 9 shows the next procedure in the method of manufacture of the fishing lure 10, where the bristle fins 38 are attached to the fishing lure 10. The bristle fins 38 are generally inserted into the grooves 40 formed between the opposing rigid structural members 14A and 14B and are adhered within the grooves 40 using an adhesive. In one embodiment, grooves 40 are formed between the left fish tail member 18A and the right fish tail member 18B of the fish tail 18 to receive the bristle fins 38. In another embodiment, the bristle fins 38 are attached to the outer surfaces 58 of the rigid structural members 14 using an adhesive. In one embodiment, the bristle fins 38 are attached to the side surfaces of the rigid structural members 14 using an adhesive. It is to be understood that the location of the bristle fins 38 is not limited to the locations described above, but may be attached at other locations on the rigid structural members 14.

FIG. 10 shows the next procedure in the method of manufacture of the fishing lure 10, where the eyes 60 and the hooks 32 are attached to the fishing lure 10. This procedure completes the method of manufacture of the fishing lure 10. As noted above, the eyes 60 are generally inserted into the grooves 56 formed on the outer surfaces 58 of the fish head 16 and are adhered to the grooves 56 using an adhesive. As noted above, the hooks 32 are attached to the loops 28 and 30 (as shown in FIG. 12) by means of the connecting rings 150 (as shown in FIG. 10). In one embodiment, the connecting rings 150 are in a spiral or helical form, similar to a key chain connector ring (but significantly smaller).

FIG. 11 shows the top view of the fishing lure 10. In one embodiment, when the fishing lure 10 is drawn through water, the body members 100-106 and the fish tail 18 undergo a side-to-side motion, thus, making the fishing lure 10 appear to be swimming. As the fishing lure 10 is drawn through water, the water develops vortices, causing an oscillating S-shaped side-to-side motion of the body members 100-106 and the fish tail 18. The relatively flat or blunt side-to-side front end surface 22 of the fish head 16, in combination with the inner, flexible fabric core 12 formed from polyester enables the fishing lure 10 to develop vortices in the water as the fishing lure 10 is drawn through the water. The blunt front end surface 22 of the fish head 16 is able to facilitate a life-like motion of the lure 10, which otherwise typically utilizes a lip or a diving bill of the type described in U.S. Pat. No. 5,182,875, hereby incorporated by reference. Such lip structures are subject to breakage and also detract from the natural appearance of the lure. The blunt configuration can be appreciated from top and bottom views of the lure (as seen in FIGS. 13 and 11), and has a naturally curved side view as seen in FIG. 12.

The shapes and sizes of the rigid structural members 14 (e.g., including the body members 100-106, the fish head 16 and the fish tail 18) are shown in FIGS. 12 and 13. FIGS. 12 and 13 show the side view and the bottom view of the fishing lure 10 respectively. In the illustrated embodiment, the fishing lure 10 generally is 6.5 inches long. The maximum width of the fishing lure 10 generally is 0.795 inches, while the maximum height of the fishing lure is 1.47 inches. In the illustrated embodiment, the spacing between the rigid structural members is generally constant and is generally equal to 0.093 inches and the width of each body member 20 (e.g., body members 100-106) is generally constant and is generally equal to 0.390 inches. In another embodiment, the width of the each body member 20 that is located between the fish head 16 and fish tail 18 is not necessarily fixed and can vary from one body member to another body member.

The body member 100 and the body member 106 are located adjacent to the fish head 16 and the fish tail 18, respectively. As shown in FIG. 13, the fishing lure 100 flares slightly from the front end 22 to rear end 110 of the fish head 16. The fishing lure 10 gradually tapers from front end 112 of the second body member 100 until the rear end 114 of the penultimate body member 106. The fish tail 18 of the fishing lure 10 gradually flares outwardly from one end 116 thereof to the other end 118 thereof.

As noted above and as shown in FIG. 13, the front end 22 of the fish head 16 includes a relatively blunt transverse configuration (perpendicular to the longitudinal axis) when viewed from the top and/or bottom of the lure 10. In one embodiment, rear end 120 of the fish tail 18 also includes a relatively blunt transverse configuration as also illustrated in FIG. 13. The relatively blunt transverse cross-sectional configuration at the front end 22 of the fish head 16, and the inner, flexible fabric core formed from polyester enables the fishing lure 10 to provide the life-like serpentine movement as the fishing lure 10 is drawn through the water.

The fishing lure 10, thus formed, is generally connected to an end of the fishing line (not shown), which is connected to a fishing rod and a reel (not shown). The fishing lure 10 is then cast into areas of water where target species of fish may be found. The fishing lure 10 may be skillfully moved in the areas of water to attract target species of fish, and to encourage the target species of fish to bite the fishing lure 10. In one embodiment, the fishing lure 10 may be used for large mouth Bass. However, it is contemplated that the fishing lure 10 may be used for any kind of predator fish.

The fishing lure 10 is referred to as a lipless fishing lure because the fishing lure 10 does not include a diving bill or a diving plane provided for in prior art fishing lures. On contrary, the fishing lure 10 includes relatively blunt transverse cross-sectional configuration at the front end 22 of the fish head 16, which in combination with the flexible, polyester core 12 provides wiggling action as the fishing lure 10 is drawn through the water.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A lipless fishing lure, comprising:
    an inner, flexible fabric core; and
    a plurality of separately formed substantially rigid structural members adhered to the fabric core on opposite sides of the core, wherein the rigid structural members are generally evenly spaced from one another in a longitudinal direction of the lure to define a gap between adjacent rigid structural members on each side of the core;
    wherein the rigid structural members and the fabric core generally define the shape of a fish, and wherein one pair of the rigid structural members on opposite sides of the core includes a left fish head member and a right fish head member adhered to each other at inner surfaces thereof and to a portion of the flexible fabric core so as to form a fish head devoid of a diving bill, the fish head having a front end shaped and configured to provide, in combination with the fabric core, a serpentine movement of the fishing lure, when the fishing lure is pulled through water.

2. The fishing lure of claim 1, wherein the front end of the fish head has a relatively blunt transverse cross-sectional configuration.

3. The fishing lure of claim 1, wherein the rigid structural members are made from a plastic material.

4. The fishing lure of claim 1, wherein the rigid structural members are made from wood.

5. The fishing lure of claim 1, wherein the inner, flexible fabric core is made from a nylon material.

6. The fishing lure of claim 1, wherein a color coating is applied to the rigid structural members using air brush technique.

7. The fishing lure of claim 6, wherein a holographic pattern of a fish to be replicated is transferred to and adhered to surfaces of the rigid structural members using hot stamping technique, prior to applying the color coating to the rigid structural members.

8. The fishing lure of claim 1, further comprising a plurality of bristle fins extending from a top surface of the fish head and at least one other pair of the rigid structural members on opposite sides of the core.

9. The fishing lure of claim 8, wherein the fish head defines a first groove between the left fish head member and the right fish head member, and the at least one other pair of the rigid structural members defines a second groove formed between the at least one other pair rigid structural members for receiving the bristle fins, and wherein the bristle fins are attached to the fish head and the at least one other pair of the rigid structural members with an adhesive.

10. The fishing lure of claim 1, wherein one other pair of the rigid structural members on opposite sides of the core includes a fish tail having a rear end including a relatively blunt transverse configuration.

11. The fishing lure of claim 10, wherein a plurality of bristle fins extends from the rear end of the fish tail.

12. The fishing lure of claim 1, wherein the rigid structural members each has a substantially parallel surface facing an adjacent rigid structural member on the same side of the core.

13. The fishing lure of claim 1, wherein the gap between adjacent rigid structural members is 0.093 inches.

* * * * *